United States Patent [19]

Wilson et al.

[11] Patent Number: 5,589,756
[45] Date of Patent: Dec. 31, 1996

[54] BATTERY CHARGER HAVING A MULTIPLE FUNCTION SENSE LINE

[76] Inventors: Nathaniel B. Wilson, 11346-8 Portobelo, San Diego, Calif. 92124; Elbert A. McLaren, II, 11291 Paul Barwick Ct., San Diego, Calif. 92126

[21] Appl. No.: 346,960

[22] Filed: Nov. 29, 1994

[51] Int. Cl.⁶ .................................................. H02J 7/00
[52] U.S. Cl. .................................................. 320/22
[58] Field of Search ........................ 320/21–24, 27–29, 320/39, 5

[56] References Cited

U.S. PATENT DOCUMENTS

| | | | |
|---|---|---|---|
| 5,018,188 | 5/1991 | Kowalski et al. | 379/63 |
| 5,113,127 | 5/1992 | Hoffman et al. | 320/21 |
| 5,113,128 | 5/1992 | Ohara et al. | 320/21 |
| 5,115,182 | 5/1992 | Ehmke et al. | 320/22 |
| 5,150,031 | 9/1992 | James et al. | 320/39 |
| 5,317,249 | 5/1994 | Ford | 320/22 |
| 5,325,040 | 6/1994 | Bogut et al. | 320/22 |
| 5,333,176 | 7/1994 | Burke et al. | 379/58 |
| 5,371,453 | 12/1994 | Fernandez | 320/5 |
| 5,422,559 | 6/1995 | Hall et al. | 320/21 |

*Primary Examiner*—Peter S. Wong
*Assistant Examiner*—K. Shin

[57] ABSTRACT

The battery charging system of the present invention charges the battery (105) of a portable, multiple mode radiotelephone (110) while the radiotelephone is operating. The radiotelephone (110) generates a clock signal having varying on/off times dependent on the radiotelephone's mode. This mode can include an analog cellular mode or a digital cellular mode. The battery charger (100) detects the clock signal's on/off times and changes the average charge current to compensate for one mode requiring a larger charge current. The clock signal is coupled to the charger using the same multiple function connection (160) as the battery's thermistor (150). The charger (100) uses the thermistor (150) to determine when the battery (105) is charged.

7 Claims, 1 Drawing Sheet

5,589,756

BATTERY CHARGER HAVING A MULTIPLE FUNCTION SENSE LINE

BACKGROUND OF THE INVENTION

1. Field of the Invention

The present invention relates to batteries. More particularly, the present invention relates to a battery charger having a multipurpose charge level sense line.

2. Description of the Related Art

Cellular radiotelephones are rapidly decreasing in size and cost. In order to accomplish these reductions, the number of parts contained in a radiotelephone are reduced. This reduces the cost of the total number of radiotelephone parts, the manufacturing costs and also reduces the weight of the unit. In order to continue these reductions in cost and weight, the radiotelephone parts count must be reduced further.

Since the battery is the portion of the radiotelephone connected to a battery charger, the radiotelephone may have contacts through the battery to the charger in order for the radiotelephone to communicate information to the charger. At least two of these contacts conduct power from the battery to the radiotelephone; one is for power and the other ground.

Another contact enables the radiotelephone to communicate the amount of charge current needed for it to both operate and charge the battery at the same time. Typically, after the battery is fully charged, the charge current is reduced to zero or to a very small "maintenance charge" level. This contact allows the radiotelephone to inform the charger that it is turned on and therefore requires more current than the normal maintenance charge.

Yet another contact connects the battery's thermistor to the charger so that the charger knows when the battery is fully fast charged. As the battery finishes fast charging, its temperature increases since a fully charged battery converts additional charge current into heat. This increased temperature decreases the resistance of the thermistor. The charger knows that the battery is charged by monitoring for this characteristic change in resistance.

All of these contacts add weight and complexity to the radiotelephone. There is a resulting need for a multiple purpose connection between the radiotelephone and the battery to reduce the weight, cost, and number of components in a radiotelephone.

SUMMARY OF THE INVENTION

The battery charger of the present invention uses one control line to control the charge current to a battery and radiotelephone. A thermistor in the battery pack adjusts the DC impedance of the control line which aids the battery charger in terminating fast charging the battery. Following high current fast charging of the battery, the charger will then apply a low current maintenance charge to the battery, with a current level selected by the radiotelephone. The radiotelephone selects one of two maintenance current levels by AC coupling or not coupling a clock signal onto the shared control line.

DETAILED DESCRIPTION OF THE PREFERRED EMBODIMENT

Figure 1:
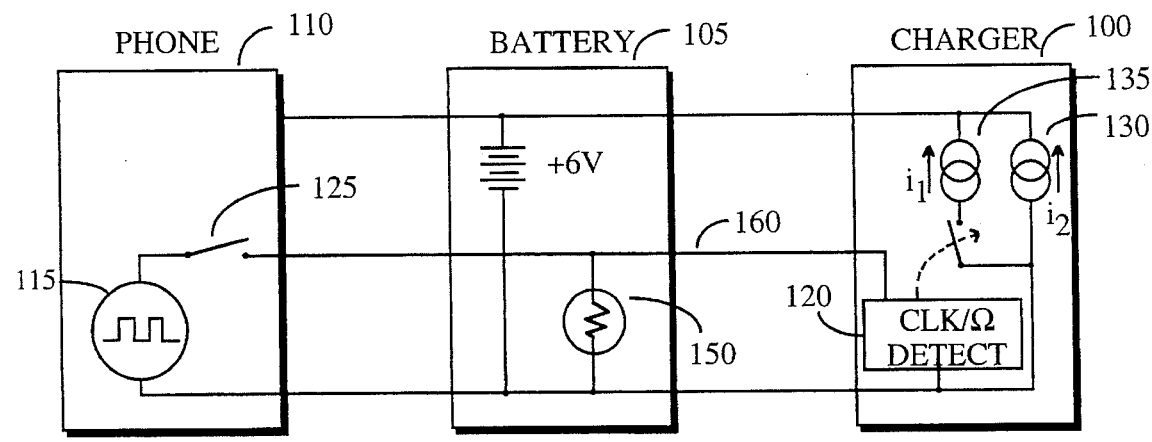
FIG. 1 shows a block diagram of the battery charging system of the present invention.

A block diagram of the battery charging system of the present invention is illustrated in FIG. 1. The system includes the battery charger (100), the radiotelephone battery (105), and the radiotelephone (110). In the preferred embodiment, the battery uses nickel metal hydride technology. However, alternate embodiments use other battery types such as nickel cadmium.

The current available to charge the battery (105) equals the current output by the charger (100) minus the current used by the radiotelephone (110). The current used by the radiotelephone may be nearly zero when the radiotelephone (110) is turned off. The current also could be one of several values that result from the radiotelephone operating in one of several modes such as the AMPS system and the CDMA cellular system in the preferred embodiment. In alternate embodiments, the radiotelephone operates in other systems such as the TDMA cellular system, a satellite communications system, or a personal communication system (PCS). Still other embodiments replace the radiotelephone with a cordless phone, two-way radio, or other devices that use a rechargeable battery and a battery charger.

In the preferred embodiment, the battery charger (100) of the present invention has at least three output current levels: fast charge, high maintenance, and low maintenance. The fast charge level is typically selected so that a dead battery can be fully charged in 30 to 120 minutes. After the battery is fully charged, the current level will normally be reduced to the low maintenance level. Low maintenance is selected to slightly exceed the battery's self-discharge current and is typically set such that a fully charged battery would be recharged in 20–40 hours. The charger substitutes the high maintenance level in place of the low maintenance level, as requested by the radiotelephone, to compensate for current consumed by the radiotelephone.

The radiotelephone (110) generates a clock signal (115) whose on/off time is dependent on the radiotelephone's mode, whether digital cellular or analog cellular. The on/off time is controlled by a switch (125) in the radiotelephone (110). The radiotelephone's controller controls the operation of the switch (125) depending on the unit's mode. The clock signal is off when the radiotelephone (110) is turned off.

The clock signal is connected to the battery charger (100) that has a clock detection circuit (120). The clock detection circuit (120) senses the on/off time of the clock.

The battery (105) of the present invention includes a thermistor (150) to prevent overcharging of the battery. As the battery (105) becomes fully charged, its heat output increases. The thermistor (150) senses the temperature change and decreases resistance as the temperature increases. The battery charger (100) monitors the resistance of the thermistor (150) and turns off the fast charge current completely when the resistance changes at a predetermined rate and the clock signal is not being detected. If the clock signal is detected, the radiotelephone (110) is still operating and requires the charge current to operate without draining the charged battery (105).

The multiple function sense line (160) of the present invention connects the thermistor (150) to the battery charger (100). This sense line (160) also carries the clock signal from the clock generator (115) to the battery charger (100). The superimposed clock signal does not impede the monitoring of the thermistor (150) since the battery charger (100) can still measure the resistance of the thermistor (150). The thermistor (150) does not impede detection of the clock since the changing resistance of the thermistor (150) does not affect the clock signal. Using this single, multiple function line (160) allows two functions to be accomplished with only one connection.

The resistance of the thermistor (150) is determined by circuitry (120) in the battery charger (100). The resistance is detected continuously in order to determine the temperature being sensed by the thermistor (150) and the rate of change of the resistance. Resistance measuring techniques are well known in the art and will not be discussed in further detail.

Figure 2:
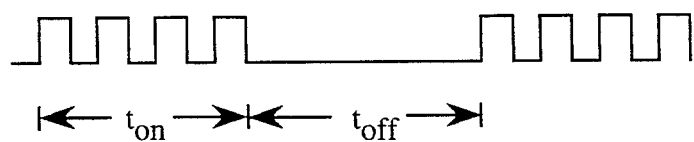
FIG. 2 shows the clock waveform generated in accordance with the present invention.

The clock signal is illustrated in FIG. 2. This clock signal is on for time $t_{on}$ and off for time $t_{off}$. These two times are used by the clock detection circuit to control the average charge current being supplied to the radiotelephone and battery. In the preferred embodiment, the clock $t_{on}$ and $t_{off}$ times are used as follows to determine the average charge current:

$$\text{average charge current} = i_1 \frac{t_{on}}{t_{on} + t_{off}} + i_2,$$

where $i_1$ is the current supplied by the first current source and $i_2$ is the current supplied by the second current source.

In this way, the charger output will be the low maintenance level (equal to $i_2$) when the clock is always off. For the high maintenance mode, the clock is pulsed on and off by the switch (125) and the average current is given by the equation above.

The $t_{on}$ and $t_{off}$ times are different for the different modes of the radiotelephone. In the preferred embodiment, the digital cellular mode has a $t_{on}$ of 420 milliseconds and a $t_{off}$ of 860 ms. Also in the preferred embodiment, the analog AMPS cellular mode has a $t_{off}$ time of 0 ms. In other words, the clock is always on in the AMPS mode. Alternate embodiments use different clock $t_{on}$ and $t_{off}$ times to achieve a different average current in the high maintenance mode.

The current sources (130 and 135) illustrated in FIG. 1 generate a fixed output current when connected to ground. The second current (130) source is always connected to ground. The first current source (135) is connected to ground through a switch (140). This switch (140) is controlled by the clock detection circuit (120) and is closed for the amount of time dictated by $t_{on}/(t_{on}+t_{off})$. When the switch (140) is closed, current $i_1$ is flowing and the charger current output is $i_1+i_2$. When the switch is open, only current $i_2$ is being output from the charger.

In operation, if a radiotelephone (110) operating in the AMPS mode is connected to the charger (100), the radiotelephone (110) is generating a clock that is on all the time. The clock detection circuit (120) switches (120) the $i_1$ current such that $i_1$ is generated all the time. This results in an average charge current from the charger of $i_1+i_2$.

Similarly, if a radiotelephone (110) operating in the CDMA mode is connected to the charger (100), the radiotelephone (110) is generating a clock that is on for 420 ms and off for 860 ms. The clock detection circuit (120) switches the $i_1$ current such that $i_1$ is generated approximately one third of the time. Using the above equation, this results in an average charge current from the charger of $0.33i_1+i_2$.

Alternate embodiments of the present invention use other processes to determine the average charge current. Still other embodiments use different $t_{off}$ and $t_{on}$ times. As an example, in the AMPS mode, if the current required for stand-by operation decreased in the future, the $t_{off}$ time will be increased to a non-zero value in order to decrease the average charge current.

The charger and charging system of the present invention, therefore, enables a single control line from a battery and radiotelephone to a battery charger, to convey battery temperature information for fast charge termination and to convey radiotelephone mode to control the maintenance level.

We claim:

1. A battery charging system having at least a first and a second charging mode, the system charging a battery in a battery powered device having at least a first and a second operating mode, the battery charging system comprising:

a battery charger for charging the battery;

a clock signal generator coupled to the battery charger by a multiple function conductor, the clock signal generator impressing a first clock signal on said multiple function conductor during the first operating mode and impressing a second clock signal on said multiple function conductor during the second operating mode;

a temperature sensing device, coupled to the multiple function conductor, for sensing a temperature of the battery;

a clock detection circuit, coupled to the multiple function conductor, for detecting the first clock signal and the second clock signal;

a temperature detection circuit, coupled to the multiple function conductor, for detecting the temperature of the battery over said multiple function conductor in response to the temperature sensing device; and a variable current source for generating a first current in the first charging mode when the first clock signal is detected and a second current in the second charging mode when the second clock signal is detected.

2. A battery charging system having at least a high output mode and a low output mode, the system charging a battery in a battery powered radiotelephone having a digital cellular operating mode and an analog cellular operating mode, the battery charging system comprising:

a battery charger for charging the battery;

a clock signal generator coupled to the battery charger by a multiple function conductor, the clock signal generator impressing a first clock signal on said multiple function conductor during the analog cellular operating mode and impressing a second clock signal on said multiple function conductor during the digital cellular operating mode;

a thermistor, coupled to the multiple function conductor, for sensing a temperature of the battery;

a clock detection circuit, coupled to the multiple function conductor, for detecting the first clock signal and the second clock signal;

a temperature detection circuit, coupled to the multiple function conductor, for detecting the temperature of the battery over said multiple function conductor in response to the thermistor; and a variable current source for generating a first current in the high output mode when the first clock signal is detected and a second current in the low output mode when the second clock signal is detected, the first current being larger than the second current.

3. A battery charging system having an average charge current, the system charging a battery in a battery powered radiotelephone having a digital cellular operating mode and an analog cellular operating mode, the system also supplying power to the radiotelephone, the battery charging system comprising:

a battery charger for charging the battery;

a clock signal generator in the battery powered radiotelephone, said battery powered radiotelephone coupled to the battery charger over a multiple function connection, the clock signal generator generating a clock signal having varying on and off times over said multiple function connection in response to the digital cellular operating mode and the analog cellular operating mode;

a clock detection circuit in the battery charger for detecting the varying on and off times, the clock detection circuit coupled to the multiple function connection;

a thermistor coupled to the multiple function connection, the thermistor having a resistance rate of change responsive to a temperature of the battery;

a resistance detection circuit in the battery charger for detecting the resistance rate of change of the thermistor over said multiple function connector, the resistance detection circuit coupled to the multiple function connection;

a first current source for generating a first current; and a second current source for generating a second current, the first and second current sources together generating the average charge current in response to the varying on and off times.

4. The battery charging system of claim 1 further comprising:

a switch, coupled to said multiple function conductor and said clock signal generator and interposed therebetween, for selectively applying said first and second clock signals to said multiple function conductor in response to said operating mode of said battery powered device.

5. A method for charging a battery in a battery charging system having at least a first and a second charging mode, the system charging a battery in a battery powered device having at least a first and a second operating mode, the method comprising the steps of:

generating, in the battery powered device, a first clock signal during the first operating mode and a second clock signal during the second operating mode;

impressing said first clock signal on a multiple function conductor during the first operating mode and impressing said second clock signal on said multiple function conductor during the second operating mode;

sensing a temperature of the battery;

detecting the first clock signal and the second clock signal;

detecting the temperature of the battery over said multiple function conductor in response to the temperature sensing device; and generating a first current in the first charging mode when the first clock signal is detected and a second current in the second charging mode when the second clock signal is detected.

6. A method for charging a battery in a battery charging system having at least a high output mode and a low output mode, the system charging a battery in a battery powered radiotelephone having a digital cellular operating mode and an analog cellular operating mode, the method comprising the steps of:

generating, in the battery powered radiotelephone, a first clock signal during the analog cellular operating mode and a second clock signal during the digital cellular operating mode;

impressing said first clock signal on a multiple function conductor during the analog cellular operating mode and impressing a second clock signal on said multiple function conductor during the digital cellular operating mode;

sensing a temperature of the battery;

detecting the first clock signal and the second clock signal;

detecting the temperature of the battery over said multiple function conductor in response to the thermistor; and generating a first current in the high output mode when the first clock signal is detected and a second current in the low output mode when the second clock signal is detected, the first current being larger than the second current.

7. A method for charging a battery in a battery charging system having an average charge current, the system charging a battery in a battery powered radiotelephone having a digital cellular operating mode and an analog cellular operating mode, the system also supplying power to the radiotelephone, the method comprising the steps of:

generating, in the battery powered radiotelephone, a clock signal having varying on and off times over a multiple function connection in response to the digital cellular operating mode and the analog cellular operating mode;

detecting the varying on and off times;

sensing the temperature of the battery;

detecting the temperature of the battery over said multiple function conductor in response to the thermistor; and generating the average charge current in response to the varying on and off times.

* * * * *